United States Patent
McCabe

[11] 3,762,548
[45] Oct. 2, 1973

[54] UNDERWATER TANKER BALLAST WATER/OIL SEPARATION

[75] Inventor: John S. McCabe, Naperville, Ill.

[73] Assignee: Chicago Bridge & Iron Company, Oak Brook, Ill.

[22] Filed: Nov. 19, 1971

[21] Appl. No.: 200,434

[52] U.S. Cl............ 210/170, 210/187, 210/522, 210/540, 210/DIG. 21
[51] Int. Cl............................................ B01d 21/10
[58] Field of Search........................ 210/83, 84, 170, 210/242, 519, 522, 540, DIG. 21, 187

[56] References Cited
UNITED STATES PATENTS

| | | | |
|---|---|---|---|
| 1,406,950 | 2/1922 | Fackert | 210/242 X |
| 3,703,960 | 11/1972 | Kennedy | 210/170 X |
| 3,638,796 | 2/1972 | Tuggle et al. | 210/170 |
| 2,940,594 | 6/1960 | Crozier | 210/540 X |
| 3,500,841 | 3/1970 | Logan | 210/242 X |
| 3,389,559 | 6/1968 | Logan | 210/242 X |
| 835,216 | 11/1908 | Chozier | 210/540 X |
| 2,744,630 | 5/1956 | Hughes | 210/540 |

Primary Examiner—John Adee
Attorney—Charles J. Merriam et al.

[57] ABSTRACT

Method and apparatus for separating oil from tanker ballast water. Ballast is pumped to underwater disengagement zone operating on water displacement principle. Oil separated from ballast mixture rises to a collection zone from which it is recovered; water escapes from open bottom of disengagement zone to main body of water.

2 Claims, 3 Drawing Figures

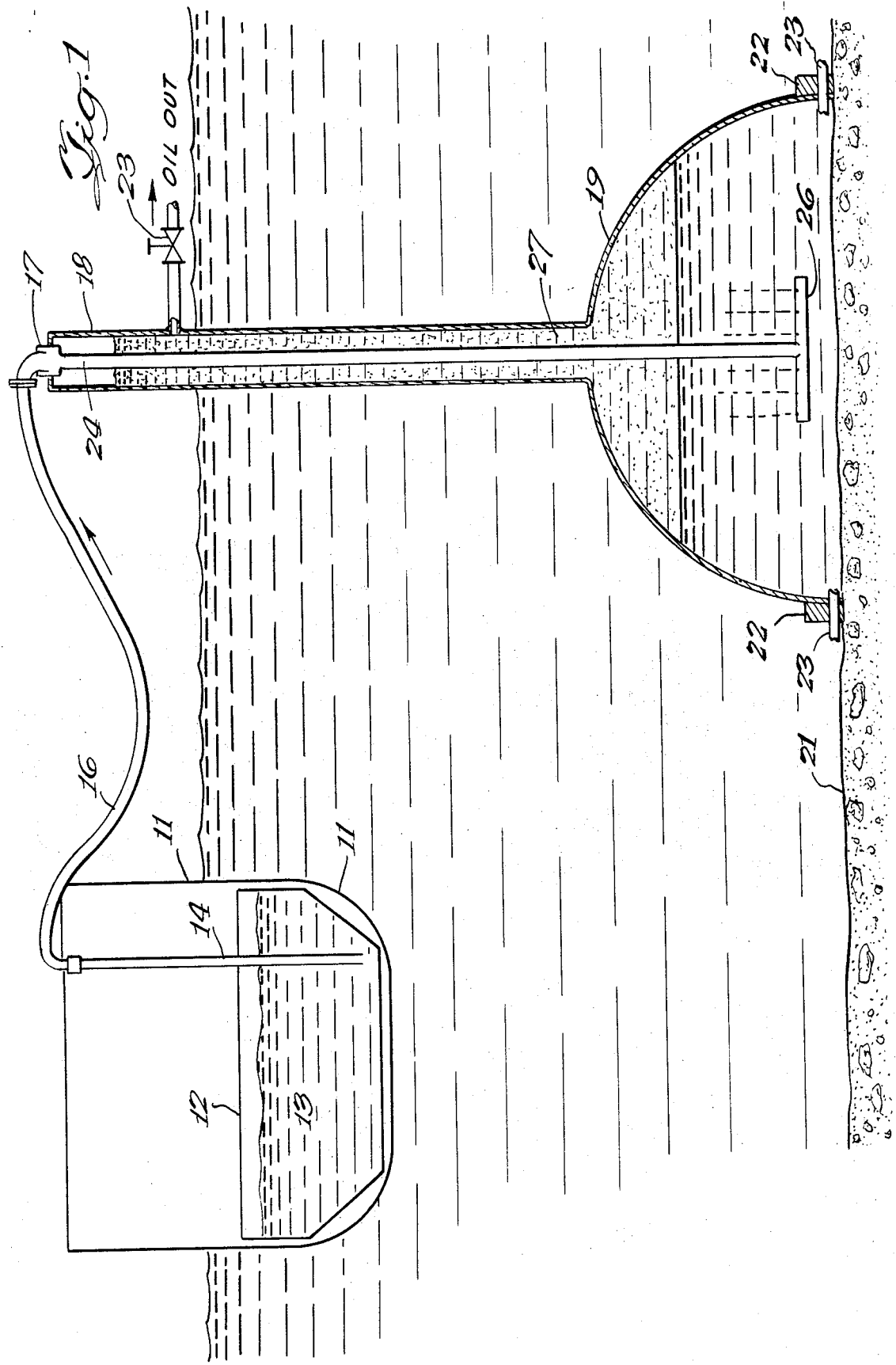

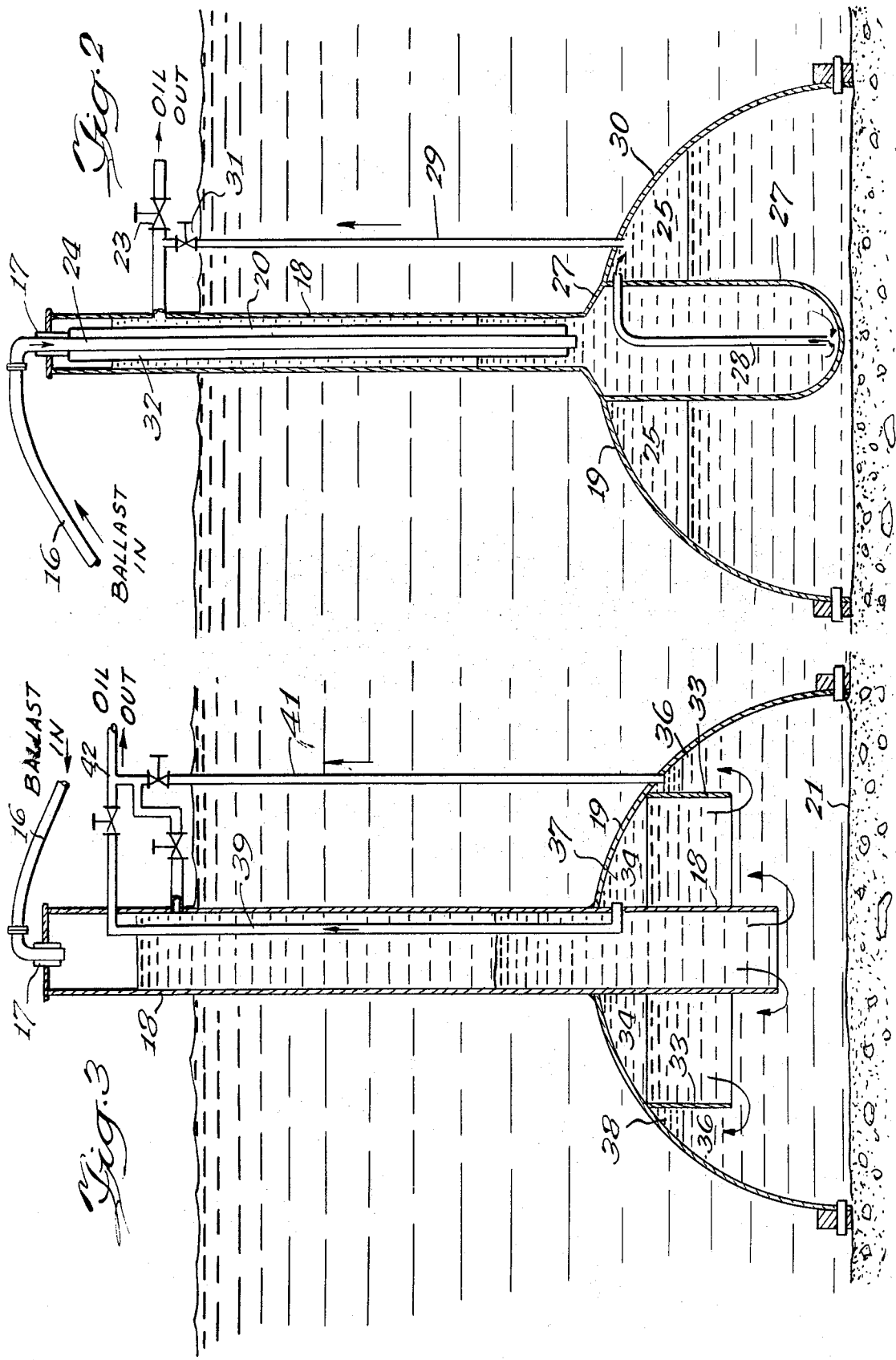

UNDERWATER TANKER BALLAST WATER/OIL SEPARATION

This invention relates to apparatus and a method for treating oil tanker water ballast for disposal. More particularly, it relates to apparatus and a method for treating ballast water in order to recover the oil content thereof and to permit the water to be discharged without creating pollution.

It is conventional practice in the operation of oil tankers to fill the tanks thereof with ballast water after an oil cargo has been discharged, in order to improve the handling characteristics of the vessel for the return voyage. At the end of the return voyage, however, the problem of disposal of the water ballast arises. In the past it has been customary to discharge the ballast into the main body of water in which the vessel is situated, in spite of the fact that the water is contaminated with residual oil from the tanks in which it is carried. With the increasing concern now being given to preventing pollution of the oceans and other large bodies of water, however, it is evident that the disposal of ballast water overboard cannot be tolerated, so that there exists a need for an effective relatively inexpensive method for handling the disposal of this water.

There have been attempts in the past to treat ballast water on board ship prior to its discharge overboard, or to pump the ballast to a land station for treatment and disposal. Neither of these possible solutions, however, is satisfactory. The cost of transferring large volumes of ballast water to a land station for treatment is very high, while treatment of the water on board ship is dangerous because of the risk of explosion. There have in fact been several explosions recorded in large tankers while cleaning operations were being conducted on their tanks.

The method and apparatus of the present invention provide a simple but effective way of solving the disposal problem encountered with large amounts of ballast water. Not only does the method prevent contamination of the seas with discharged oil, but it also permits the oil content of the ballast water to be recovered, thereby reducing the economic loss which has heretofore been entailed in discarding ballast water.

Briefly described, the invention contemplates transferring ballast water contaminated with entrained or emulsified oil to an underwater disengagement zone operating on the water displacement principle, as exemplified by an underwater storage tank having an upwardly convex shell with an opening in its bottom through which water can move into and out of the shell as the volume of oil enclosed within the storage zone fluctuates. The ballast mixture of water and oil is introduced into the disengagement zone, where it separates under the influence of gravity into separate oil and water phases. The oil layer rises to a point from which it can be recovered, while the separated water flows out of the open bottom of the zone into the body of water.

The invention will be better understood from the following detailed description thereof, taken in conjunction with the accompanying drawings, in which like numerals are used to identify similar elements in the several views, and in which:

FIG. 1 is a schematic drawing in vertical section showing ballast water being transferred from a tanker to an underwater water/oil separator in accordance with the invention;

FIG. 2 is a vertical section of a different embodiment of a water/oil separator of the invention, showing a two zone separation system; and FIG. 3 is a vertical section of still another embodiment of the apparatus of the invention, showing another variation of a multi-zone separation system.

Referring to FIG. 1, there is depicted schematically and in cross section the hull 11 of a tanker containing therein a ballast tank 12 used to contain oil or ballast water. Introduced into ballast tank 12 which, in the instance under consideration, contains ballast water 13, is dip pipe 14 which is connected at its upper end to flexible hose 16 leading to swivel joint 17 at the top of standpipe 18, which communicates at its lower end with upwardly convex shell 19 which has an open bottom and rests on the floor 21 of the body of water in which the vessel is floating. Shell 19 is held in place on floor 21 by weights 22, or if necessary or desirable, by additional anchoring means not shown. The interior of shell vessel 19 is open to the main body of water through conduits 23 which permit water to pass freely in and out of the interior of the shell 19. Attached to standpipe 18 at a point near its upper end and above the surface of the main body of water is manifold system 23 communicating with the interior of the standpipe. Connected to swivel joint 17 at the top of standpipe 18 is vertical supply conduit 24, which is attached at its lower end to sparge means 26. It will be appreciated that the sparge means is not necessary, although desirable, and that the ballast water could be introduced at the top of standpipe 18. It will be generally found desirable, however, to avoid disturbing the oil phase 27 which accumulates in the standpipe and upper portion of the hollow vessel, by transferring the incoming ballast mixture to the bottom of vessel 19. Sparge means 26, by distributing the oil droplets in the ballast mixture, permits these droplets to collect more readily into larger globules and to form the oil phase 27 shown floating in the upper portion of the hollow vessel.

Variations of the water/oil separator of the invention are shown in FIGS. 2 and 3. In FIG. 2, the lower end of standpipe 18 is enlarged and closed at its lower end to form a hollow vessel 27. Convex shell 19 is attached to the upper end of vessel 27 to form an annular zone 25 between the shell and the wall of the vessel, which is sealed against upward flow of any oil which accumulates therein. Vessel 27 is provided with conduit 28 which communicates from a point in the interior of the vessel near its lower end to a point outside vessel 27 in annular zone 25. Pipe 29 and valve 31 are connected to manifold 23 for recovering the oil which accumulates in zone 25. Encircling supply conduit 24 within standpipe 18 is heating jacket 32 which is energized in any suitable manner, such as by steam or electricity (not shown). Heating jacket 32 heats the incoming ballast mixture of oil and water, thereby facilitating its separation into oil and water phases in vessel 27 and annular zone 25, as will be apparent to those skilled in the art.

It will be seen that the apparatus of FIG. 2 permits a two-stage phase separation of oil and water to occur. Some of the ballast mixture supplied to the vessel 27 will separate into an oil layer 20 which rises into standpipe 18, and a water phase still containing some oil. As additional ballast mixture is introduced into vessel 27, the still unseparated mixture of water and oil is forced upwardly through conduit 28 into annular zone 25. Additional separation will occur in zone 25 and gradually a pool of floating oil 30 will collect at the upper end of the zone. The floating oil in the annular zone can be recovered through conduit 29 and valve 31, which communicate with manifold system 23.

Still another embodiment of a multi-stage separation apparatus is shown in FIG. 3. In this version, standpipe 18 is open at its bottom and extends below the point of attachment of shell 19 thereto, to a point near floor 21. Within the interior of shell 19, an annular vertical baffle 33 is attached to shell 19, spaced from and encircling the lower end of standpipe 18, which defines in part annular zones 34 and 36 surrounding standpipe 18.

It will be seen that the embodiment of FIG. 3 contains three zones in which oil/water separation can occur. The first zone is standpipe 18 itself. The oil which separates during passage of the ballast mixture downwardly through the standpipe rises to the top and accumulates as a separate phase. The unseparated oil/water mixture or emulsion flows to the bottom of standpipe 18 and escapes below its open end. Because the mixture is lighter than the water within shell 19, it rises into annular zone 34 between the outer surface of standpipe 18 and the inner surface of the annular baffle 33. The oil which separates from the mixture rises and accumulates as an upper phase 37 within annular zone 34. As additional unseparated oil/water ballast mixture is supplied, it escapes around the lower edge of annular baffle 33 and floats upwardly to second annular zone 36 defined by the outer surface of baffle 33 and the of shell 19. The oil which separates in annular zone 36 rises to the top of the zone and collects as an upper phase 38. Conduits 39 and 41 lead respectively from first annular zone 34 and second annular zone 36 to the manifold system 42 and permit oil accumulations in each of these zones to be recovered as desired.

It will be seen that the apparatus and method of the invention permit the separation of oil from water in ballast mixtures, both for the economic value of the oil itself, as well as for preventing pollution of the body of water into which the ballast water is ultimately discharged. It will further be apparent to those skilled in the art that any additives conventionally used in the past for facilitating the separation of oil/water mixtures or emulsions can be used in conjunction with this invention, provided however, that such added materials do not cause contamination of the water being treated.

The foregoing detailed description has been given for clearness of understanding only, and no unnecessary limitations should be understood therefrom, as modifications will be obvious to those skilled in the art.

I claim:

1. Apparatus adapted to rest on the floor of a body of water for underwater offshore treatment of tanker ballast water containing entrained or emulsified oil therein, said apparatus comprising:

a vertical standpipe communicating from a point near the floor of said body of water to a point above the water surface;

an upwardly convex shell encircling said standpipe and attached thereto at a point above its lower end, said shell and standpipe defining an annular volume which is sealed against upward flow of liquid, said shell being open at the bottom;

an annular vertical baffle spaced from and encircling said standpipe below said convex shell, said baffle being joined at its upper end to said shell, dividing said annular volume into two zones, each of which is sealed against upward flow of liquid but which is open at its lower end for liquid flow;

means for introducing ballast water to the interior of said standpipe;

means near the top of said standpipe for recovering oil separated from said ballast water; and means for recovering oil collected in each of said separate annular zones.

2. The apparatus of claim 1 which includes heating means for heating the ballast water as it is introduced to the interior of said standpipe.

* * * * *